(12) United States Patent
Kobayashi et al.

(10) Patent No.: US 12,348,691 B2
(45) Date of Patent: Jul. 1, 2025

(54) DETERMINE WHETHER OCR IS TO BE PERFORMED FOR OPTIMIZING OPTICAL CHARACTER RECOGNITION PROCESS

(71) Applicant: FUJIFILM Business Innovation Corp., Tokyo (JP)

(72) Inventors: Kunihiko Kobayashi, Kanagawa (JP); Shintaro Adachi, Kanagawa (JP); Junichi Shimizu, Kanagawa (JP); Akane Abe, Kanagawa (JP); Shinya Nakamura, Kanagawa (JP); Akinobu Yamaguchi, Kanagawa (JP); Masanori Yoshizuka, Kanagawa (JP); Naomi Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 479 days.

(21) Appl. No.: 17/700,523

(22) Filed: Mar. 22, 2022

(65) Prior Publication Data

US 2023/0102476 A1    Mar. 30, 2023

(30) Foreign Application Priority Data

Sep. 24, 2021  (JP) ................................. 2021-156076

(51) Int. Cl.
*H04N 1/32*      (2006.01)
(52) U.S. Cl.
CPC ....... *H04N 1/32192* (2013.01); *H04N 1/3232* (2013.01); *H04N 2201/3266* (2013.01)

(58) Field of Classification Search
CPC ............. H04N 1/32192; H04N 1/3232; H04N 2201/3266
See application file for complete search history.

(56) References Cited

U.S. PATENT DOCUMENTS

| 8,294,928 B2 | 10/2012 | Okabe |
| 2005/0210009 A1* | 9/2005 | Tran .................... H04L 63/08 |
| 2008/0016506 A1* | 1/2008 | Okabe ................ H04N 1/32122 |
| | | 718/100 |
| 2016/0119506 A1* | 4/2016 | Namihira ........... H04N 1/00328 |
| | | 358/426.01 |

FOREIGN PATENT DOCUMENTS

| JP | H08161350 | 6/1996 |
| JP | 2008015579 | 1/2008 |

* cited by examiner

*Primary Examiner* — Christopher Wait
(74) *Attorney, Agent, or Firm* — JCIPRNET (57) ABSTRACT

An information processing apparatus includes a processor configured to: receive an electronic document generated while maintaining text information by an application program or an electronic document generated by reading an image with a document reading apparatus; perform type determination as to whether the received electronic document including a portion representing a text is generated by the application program or generated by the document reading apparatus; and determine based on a result of the type determination whether an optical character recognition process is to be performed on the electronic document.

14 Claims, 8 Drawing Sheets

| No. | TYPE | COLOR | POSITION(X, Y, W, H)/UNIT mm |
|---|---|---|---|
| 1 | IMAGE | — | 30, 50, 10, 20 |
| 2 | TEXT | BLACK | 2, 50, 30, 20 |
| 3 | TEXT | BLUE | 2, 30, 30, 20 |

FIG. 8B

| No. | TYPE | COLOR | POSITION(X, Y, W, H)/UNIT mm |
|---|---|---|---|
| 1 | IMAGE | — | 0, 0, 210, 297 |
| 2 | TEXT | TRANSPARENT | 2, 50, 30, 20 |
| 3 | TEXT | TRANSPARENT | 2, 30, 30, 20 |

DETERMINE WHETHER OCR IS TO BE PERFORMED FOR OPTIMIZING OPTICAL CHARACTER RECOGNITION PROCESS

CROSS-REFERENCE TO RELATED APPLICATIONS

This application is based on and claims priority under 35 USC 119 from Japanese Patent Application No. 2021-156076 filed Sep. 24, 2021.

BACKGROUND

(i) Technical Field

The present disclosure relates to an information processing apparatus, a non-transitory computer readable medium storing a program, and an information processing method.

(ii) Related Art

Japanese Unexamined Patent Application Publication No. 8-161350 discloses an electronic filing apparatus including: a character information analysis unit that analyzes character information in document information produced by a general application software; a reading unit that reads the document information; an analysis unit that analyzes a document structure of the read document information; a generation unit that generates character information from the document information analyzed to be a character part by the analysis unit; a storing unit that stores the document information including the generated character information and the character information analyzed; and a search unit that searches for the stored character information.

SUMMARY

Some electronic documents are generated while maintaining text information by an application program, and other electronic documents are generated by reading an image with a document reading apparatus.

When such electronic documents are managed, it is not necessary to perform optical character recognition process on an electronic document generated while maintaining text information by an application program. However, for an electronic document generated by reading an image with a document reading apparatus, optical character recognition process is necessary to enable text search in the electronic document.

Aspects of non-limiting embodiments of the present disclosure relate to providing an information processing apparatus and a non-transitory computer readable medium storing a program that are capable of determining whether an electronic document needs optical character recognition process.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive an electronic document generated while maintaining text information by an application program or an electronic document generated by reading an image with a document reading apparatus; perform type determination as to whether the received electronic document including a portion representing a text is generated by the application program or generated by the document reading apparatus; and determine based on a result of the type determination whether an optical character recognition process is performed on the electronic document.

BRIEF DESCRIPTION OF THE DRAWINGS

Exemplary embodiment of the present disclosure will be described in detail based on the following figures, wherein.

DETAILED DESCRIPTION

Exemplary Embodiment

Hereinafter, an example of an exemplary embodiment of the present disclosure will be described with reference to the drawings. Note that in each of the drawings, the same or equivalent components and portions are labeled with the same reference sign. The dimensional ratio of the drawings is exaggerated for the illustrative purpose, and may be different from the actual ratio.

Figure 1:
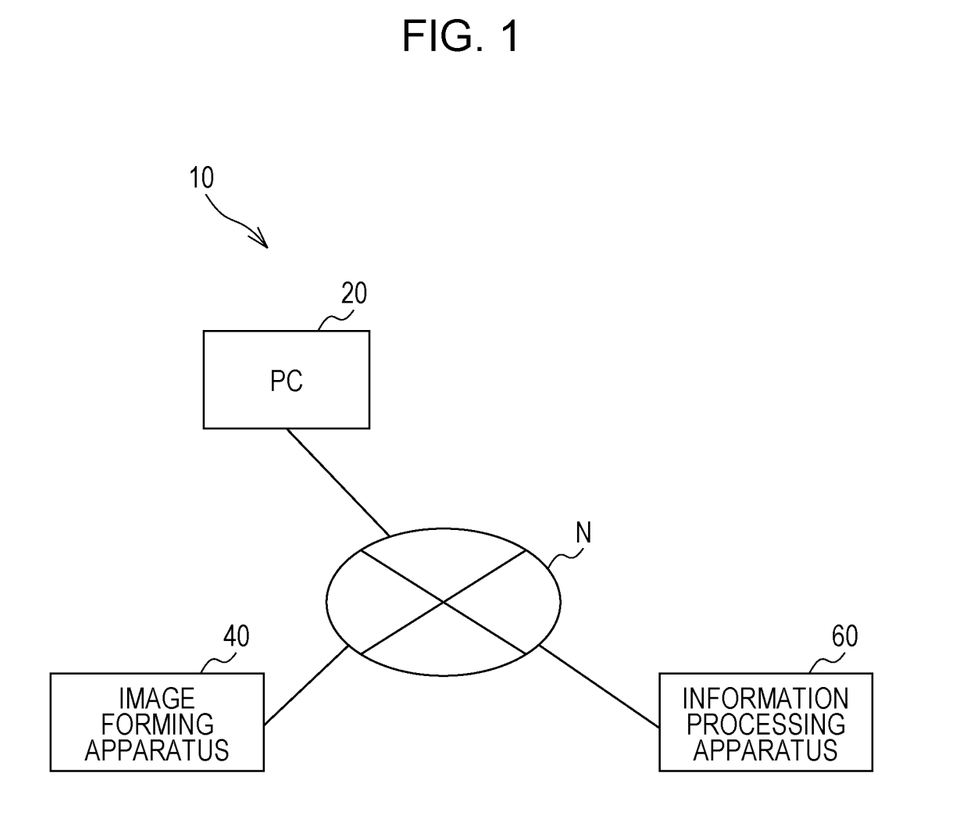
FIG. 1 is a schematic configuration diagram of an information processing system according to an exemplary embodiment of the present disclosure.

An example of an information processing system 10 according to the exemplary embodiment will be described with reference to FIG. 1. FIG. 1 is a diagram illustrating the schematic configuration of the information processing system 10 according to the exemplary embodiment. As illustrated in FIG. 1, the information processing system 10 according to the exemplary embodiment includes a personal computer (PC) 20, an image forming apparatus 40, and an information processing apparatus 60. Here, the image forming apparatus 40 is an example of a document reading apparatus.

The PC 20, the image forming apparatus 40 and the information processing apparatus 60 are connected via a network N. For example, the Internet, a local area network (=LAN), a wide area network (=WAN) and the like are applied to the network N.

In the information processing system 10, the PC 20 in the exemplary embodiment stores an electronic document in the information processing apparatus 60.

The image forming apparatus 40 in the exemplary embodiment has various functions, such as a print function, a copy function, a facsimile function, and a scanner function. In the information processing system 10, the image forming apparatus 40 stores an electronic document in the information processing apparatus 60.

The information processing apparatus 60 in the exemplary embodiment stores an electronic document transmitted from the PC 20 and the image forming apparatus 40.

The information processing system 10 in the exemplary embodiment is an electronic filing system that stores an electronic document transmitted from the PC 20 and the image forming apparatus 40, and enables text search from a user for attribute information extracted by optical character recognition (OCR) processing and for text data embedded in an electronic document. Here, the electronic document includes a portable document format (PDF) (so-called a born-digital PDF) generated by the PC 20, and a PDF created from scanning by the scanner function of the image forming apparatus 40.

The hardware configuration of the image forming apparatus 40 will be described.

Figure 2:
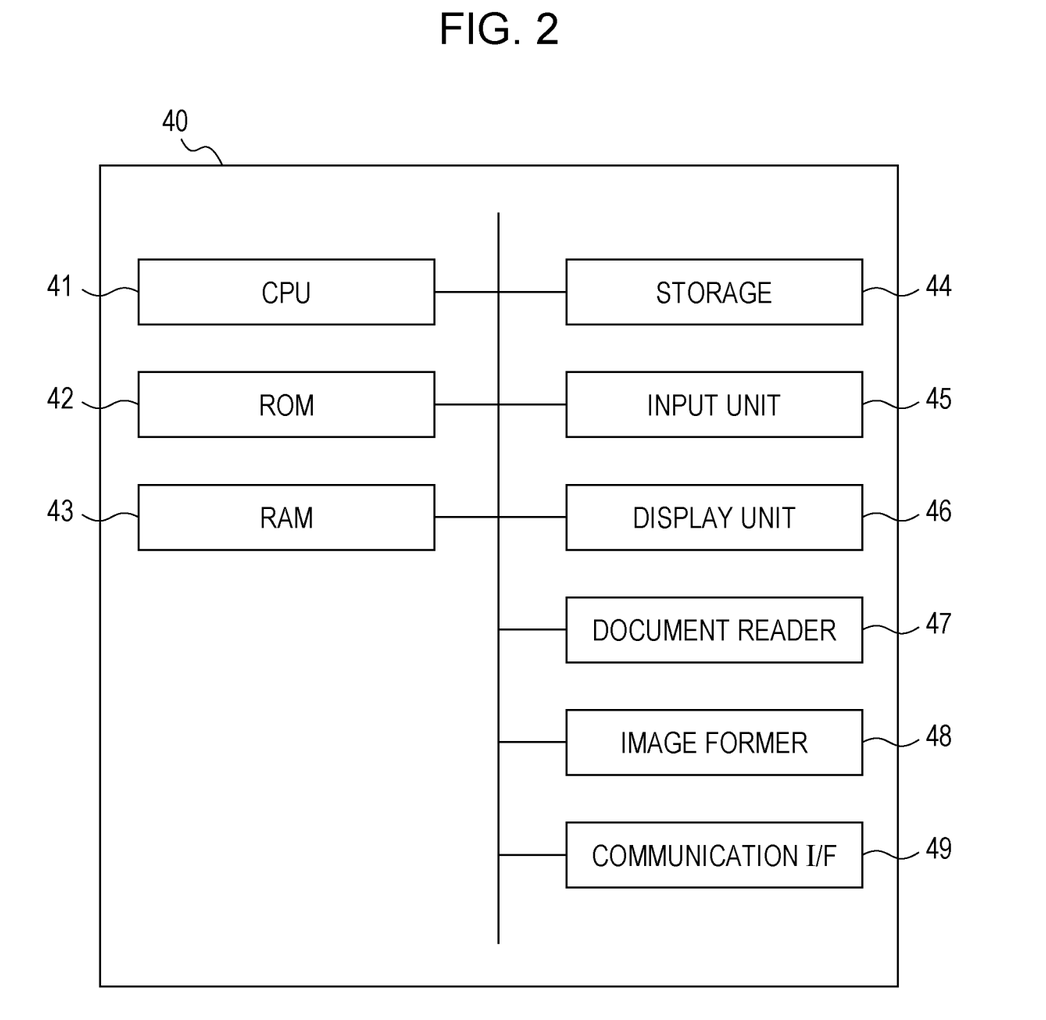
FIG. 2 is a schematic block diagram of an image forming apparatus according to the exemplary embodiment of the present disclosure.

FIG. 2 is a block diagram illustrating the hardware configuration of the image forming apparatus 40 according to the exemplary embodiment. As illustrated in FIG. 2, the image forming apparatus 40 has a CPU (central processing unit) 41 which is an example of a processor, a read only memory (ROM) 42, a random access memory (RAM) 43, a storage 44, an input unit 45, a display unit 46, a document reader 47, an image former 48, and a communication I/F 49. The components are connected to each other to enable communication via a bus.

The CPU 41 is a central processing unit, and executes various programs and controls the components. Specifically, the CPU 41 reads a program from the ROM 42 or the storage 44, and executes the program using the RAM 43 as a work area. The CPU 41 performs control of the above-mentioned components and various types of processing according to the programs recorded in the ROM 42 or the storage 44. In the exemplary embodiment, the ROM 42 or the storage 44 stores programs.

The ROM 42 stores various programs and various types of data. The RAM 43 as a work area temporarily stores programs or data. The storage 44 is comprised of a hard disk drive (HDD) or a solid state drive (SSD), and stores various programs including an operating system, and various types of data.

In the exemplary embodiment, electronic documents read by the document reader 47 are stored in the storage 44.

The input unit 45 includes a pointing device such as a mouse, and a keyboard, and is used to input various data. The input unit 45 is used for instructions to start processing of optically reading a document placed on a table, such as the later-described platen glass. In the exemplary embodiment, the touch panel display unit 46 functions as the input unit 45.

For example, the display unit 46 is a liquid crystal display. The display unit 46 displays various types of information based on the control of the CPU 41. In addition, the display unit 46 adopts a touch panel method, and also functions as the input unit 45.

To implement the print function, the copy function, the facsimile function, the scanner function and the like, the document reader 47 captures a document placed on a paper feed table of an automatic feeding device (not illustrated) provided in the upper portion of the image forming apparatus 40, or a document placed on a table, such as a platen glass sheet by sheet, and generates an electronic document by optically reading an image read from the captured document.

In addition, at the time of capturing a document by the document reader 47, when a user selects to capture the document using the scanner function of the image forming apparatus 40, the CPU 41 performs an OCR process. The OCR process is a simple process having a smaller number of pre-registered word dictionaries than OCR process performed by the later-described information processing apparatus 60. In the exemplary embodiment, an electronic document on which the OCR process has been performed is embedded with generated text data, and saved as a PDF-format electronic document. Note that when a document is captured using the scanner function, the document may be read without performing the OCR process.

The PDF-format electronic document read using the scanner function of the image forming apparatus 40 records generator device information on a generator device that generated the electronic document, that is, model information, such as the model name and the model number of the image forming apparatus 40 in this example. In addition, the PDF-format electronic document is transmitted to the information processing apparatus 60 via the later-described communication I/F 49.

The image former 48 forms, specifically, prints an image on a recording media, such as paper, the image being obtained by reading with the document reader 47.

The communication I/F 49 has a function of communicating with the PC 20 and the information processing apparatus 60. The communication I/F 49 functions as a communication interface that transmits and receives various types of data to and from the PC 20 and the information processing apparatus 60. In the exemplary embodiment, the electronic document generated by the document reader 47 is transmitted to the information processing apparatus 60. Note that transmission of electronic documents from the image forming apparatus 40 to the information processing apparatus 60 is performed at a predetermined timing, for example, on a predetermined date/time or each time a predetermined number of electronic documents are generated. However, the timing is not limited to this, and each time an electronic document is generated, the electronic document may be transmitted. In addition, the communication I/F 49 connects the image forming apparatus 40 to the public line, and has a function of transmitting and receiving image information to and from another image forming apparatus having the FAX function, the image information being obtained by reading with the document reader 47.

Next, the hardware configuration of the PC 20 and the information processing apparatus 60 will be described.

Figure 3:
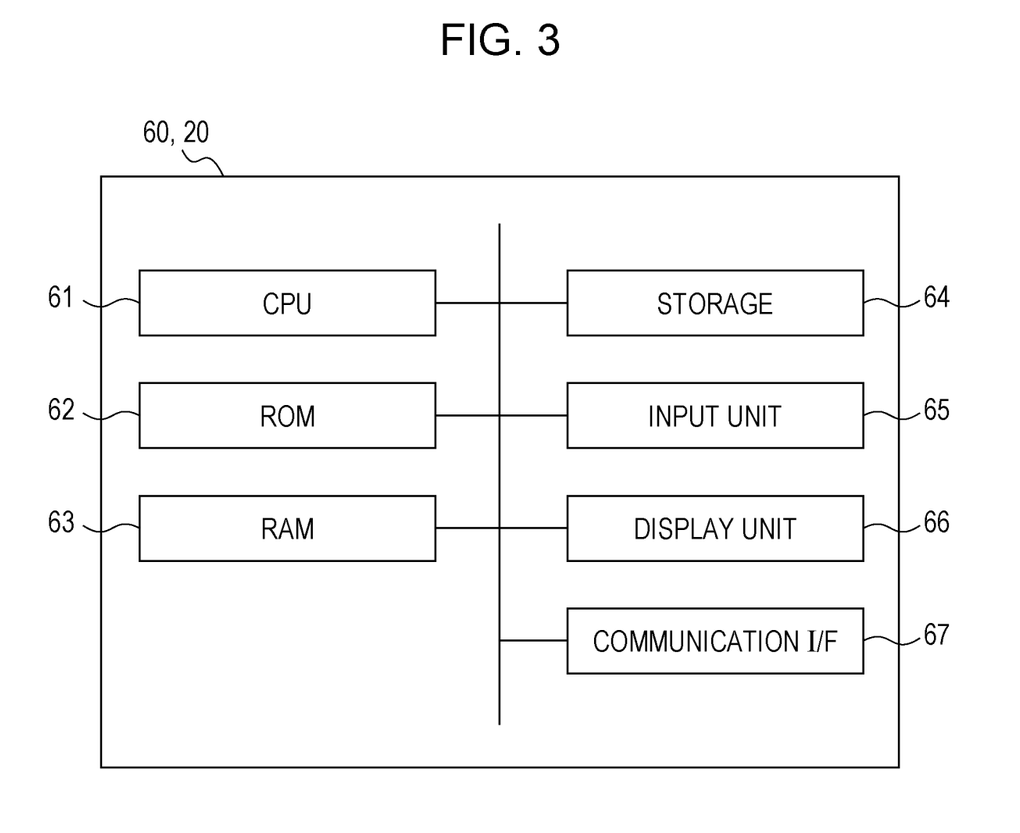
FIG. 3 is a schematic block diagram of the information processing apparatus according to the exemplary embodiment of the present disclosure.

FIG. 3 is a block diagram illustrating the hardware configuration of the PC 20 and the information processing apparatus 60 according to the exemplary embodiment. The PC 20 and the information processing apparatus 60 basically have a general computer configuration, thus the information processing apparatus 60 will be described as a representation.

As illustrated in FIG. 3, the PC 60 has a CPU 61 which is an example of a processor, a ROM 62, a RAM 63, a storage 64, an input unit 65, a display unit 66, and a communication I/F 67. The components are connected to each other to enable communication via a bus.

The CPU 61 is a central processing unit, and executes various programs and controls the components. Specifically, the CPU 61 reads a program from the ROM 62 or the storage 64, and executes the program using the RAM 63 as a work area. The CPU 61 performs control of the above-mentioned components and various types of processing according to the programs recorded in the ROM62 or the storage 64. In the exemplary embodiment, the ROM 62 or the storage 64 stores programs.

The ROM 62 stores various programs and various types of data. The RAM 63 as a work area temporarily stores programs or data. The storage 64 is comprised of an SSD and a flash memory, and stores various programs including an operating system, and various types of data.

In the exemplary embodiment, the storage 64 records the electronic documents transmitted from the PC 20 and the image forming apparatus 40. The electronic documents include an electronic document generated while maintaining text information by an application program (for example, Word or Excel (registered trademark)), and an electronic document generated by reading an image with the document reader 47 of the image forming apparatus 40. The OCR process is performed by the CPU 61 on each electronic document generated by the document reader 47 among the electronic documents stored in the storage 64. The text data generated by the OCR process is embedded in the electronic document and stored in the storage 64. Note that the storage 24 of the PC 20 stores the electronic document generated while maintaining text information by an application program of the PC 20 before the electronic document is transmitted to the information processing apparatus 60. In the exemplary embodiment, the electronic document will be described using a PDF-format electronic document as an example. The PDF-format electronic document records generator device information on a generator device that generated the electronic document. In this example, when the electronic document is generated by the image forming apparatus 40, the model information on the image forming apparatus 40 is recorded, and when the electronic document is generated by the PC 20, the name of an application program used is recorded.

In the exemplary embodiment, the storage 64 stores the later-described rule for extracting attribute data from the text data generated by the OCR process. The rule for extracting attribute data is managed and maintained by the administrator of the information processing system 10, and is updated as needed.

In addition, the storage 64 stores generator device information database. The generator device information database is a database that pre-stores model information, such as the model name and the model number of the image forming apparatus 40 that performs PDF conversion. As described below, the generator device information database is used for type determination to determine whether the PDF-format electronic document was generated by an application program of the PC 20 or generated by the document reader 47 of the image forming apparatus 40. The generator device information database is managed and maintained by the administrator of the information processing system 10, and when a new model of the image forming apparatus 40 is released, the generator device information database is updated, for example, the new model name is registered.

The input unit 65 includes a pointing device such as a mouse, and a keyboard, and is used to input various data.

For example, the display unit 66 is a liquid crystal display. The display unit 66 displays various types of information based on the control of the CPU 61.

The communication I/F 67 has a function of communicating with the PC 20 and the image forming apparatus 40. The communication I/F 67 functions as a communication interface that transmits and receives various types of data to and from the PC 20 and the image forming apparatus 40.

Figure 4:
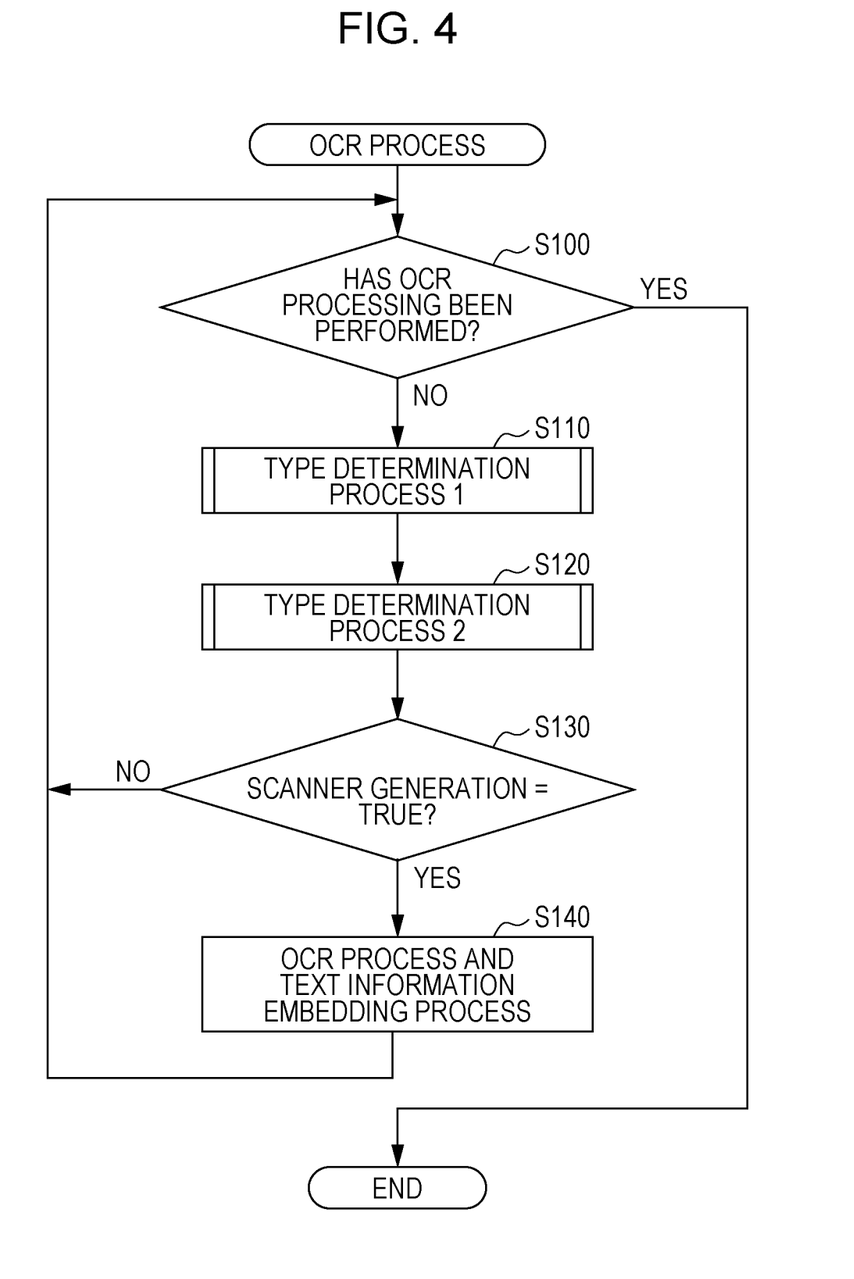
FIG. 4 is a flowchart illustrating an example of the operation of the information processing apparatus according to the exemplary embodiment of the present disclosure.

Next, an example of the operation of the information processing apparatus 60 of the exemplary embodiment will be described. FIG. 4 is a flowchart illustrating an example of the operation of an OCR process performed by the information processing apparatus 60.

In step S100 illustrated in FIG. 4, the CPU 61 of the information processing apparatus 60 determines whether the OCR process has been performed on all the multiple electronic documents on which the OCR process needs to be performed. When it is determined that the OCR process has been performed on all the electronic documents, the process is completed. When it is not determined that the OCR process has been performed on all the electronic documents, in other words, when the OCR process needs to be performed on at least one electronic document, the flow proceeds to next step S110. Note that the OCR process in the exemplary embodiment is not necessarily performed when multiple PDF-format electronic documents are collectively processed, and may be performed each time the information processing apparatus 60 receives a PDF-format electronic document.

In step S110, the CPU 61 of the information processing apparatus 60 performs type determination process 1. The type determination process 1 in step S110 will be described with reference to FIG. 5. The type determination is determination as to whether an electronic document is generated by an application program or generated by the document reader 47.

Figure 5:
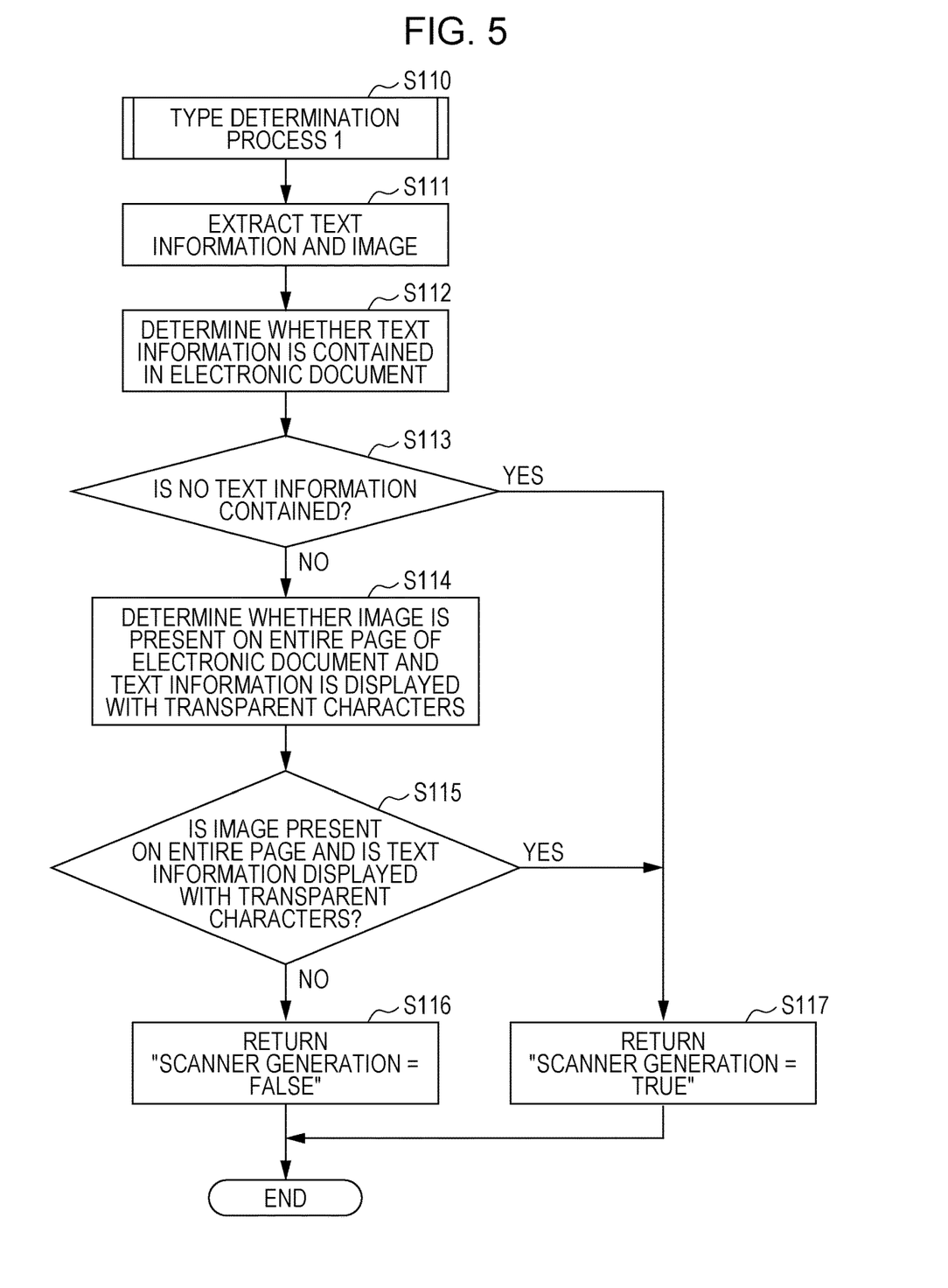
FIG. 5 is a flowchart illustrating a subroutine of type determination process 1 illustrated in FIG. 4.

First, in step S111, the CPU 61 of the information processing apparatus 60 extracts text data and an image from a PDF-format electronic document. The flow then proceeds to next step S112.

In step S112, the CPU 61 of the information processing apparatus 60 determines whether text information is contained in the electronic document. The flow then proceeds to next step S113.

In step S113, when text information is determined to be contained in step S112 described above, the flow proceeds to next step S114.

In step S114, the CPU 61 of the information processing apparatus 60 determines whether an image is present on the entire page of the electronic document and text information is displayed with transparent characters. The flow then proceeds to next step S115.

Here, the determination as to whether an image is present on the entire page of the electronic document and text information is displayed with transparent characters will be described with reference to FIG. 7 and FIGS. 8A and 8B.

Figure 7:
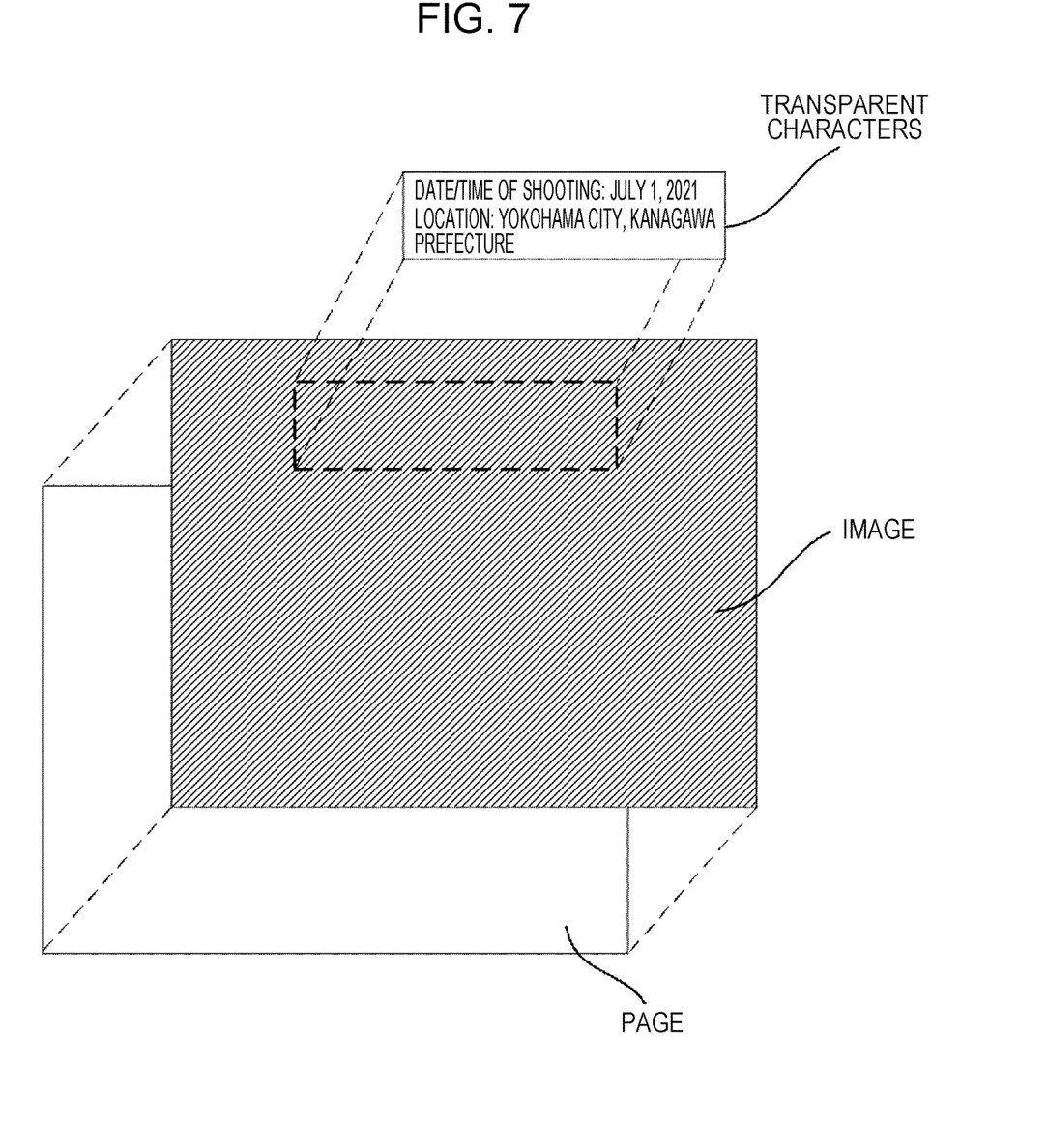
FIG. 7 is an explanatory view illustrating a state in which an image is present on the entire page of an electronic document according to the exemplary embodiment of the present disclosure, and text information is displayed with transparent characters.

FIG. 7 is a view illustrating a state in which an image is present on the entire page of an electronic document, and text information is displayed with transparent characters. Specifically, in the example of FIG. 7, an image having the same size as that of the page (for example, A4 paper size) of an electronic document is present, and transparent characters are displayed. Those transparent characters are text data generated by an OCR process performed when an image is read by the document reader 47. The reason why the presence of transparent characters is a requirement for type determination as to whether the electronic document is generated by the document reader 47 is that when an electronic document is generated by an application program, text data is unlikely to be formed with transparent characters, and text data generated by an OCR process is often formed with transparent characters in order not to interfere with viewing of the image.

Figure 8A:
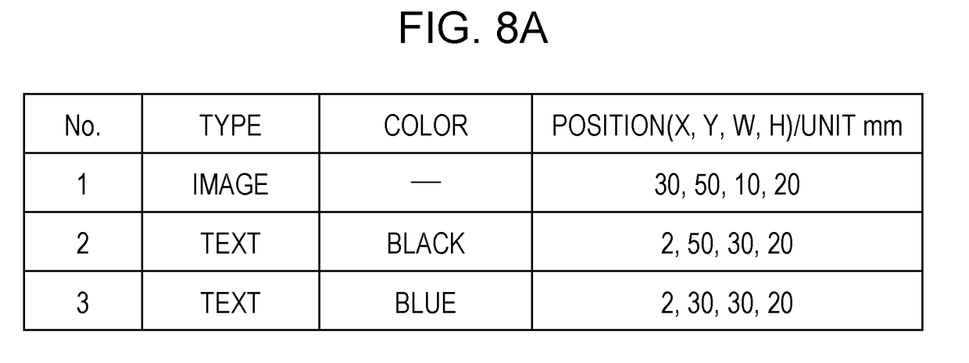
FIGS. 8A and 8B are each explanatory table illustrating a list of text information and an image extracted from the electronic document according to the exemplary embodiment of the present disclosure.
Figure 8B:
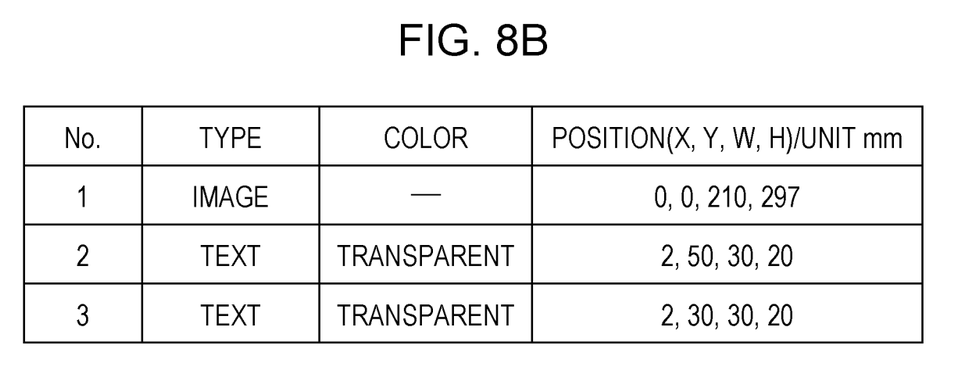

FIGS. 8A and 8B are tables illustrating a list of text information and an image extracted from an electronic document. FIG. 8A illustrates the case where one image and two pieces of text information are extracted from an electronic document in A4 size (210 mm×297 mm), for example. The coordinates (X, Y), the width (W), and the height (H) of the extracted image No. "1" are (30, 50), 10 mm, and 20 mm, respectively. The color of the text information No. "2" is "black", and the coordinates (X, Y), the width (W), and the height (H) are (2, 50), 30 mm, 20 mm, respectively. The color of the text information No. "3" is "blue", and the coordinates (X, Y), the width (W), and the height (H) are (2, 30), 30 mm, 20 mm, respectively. In the example illustrated in FIG. 8A, the size of the image is smaller than the page in A4 size, thus the image is not present on the entire page, and text information is not formed with transparent characters. Thus, the example illustrated in FIG. 8A is determined to be a PDF-format electronic document generated by an application program.

FIG. 8B illustrates the case where one image and two pieces of text information are extracted from an electronic document in A4 size (210 mm×297 mm), for example. The coordinates (X, Y), the width (W), and the height (H) of the extracted image No. "1" are (0, 0), 210 mm, and 297 mm, respectively. The color of the text information No. "2" is "transparent", and the coordinates (X, Y), the width (W), and the height (H) are (2, 50), 30 mm, 20 mm, respectively. The color of the text information No. "3" is "transparent", and the coordinates (X, Y), the width (W), and the height (H) are (2, 30), 30 mm, 20 mm, respectively. In the example illustrated in FIG. 8B, the page in A4 size and the size of the image are the same size, thus the image is present on the entire page, and text information is displayed with transparent characters. Thus, the example illustrated in FIG. 8B is determined to be a PDF-format electronic document generated by the document reader 47.

In step S115, when it is not determined in step S114 described above that the image is present on the entire page and text information is formed with transparent characters, the flow proceeds to next step S116.

In step S116, the CPU 61 of the information processing apparatus 60 returns "scanner generation=False". In other words, determination that the electronic document is not read by the document reader 47, but is generated by an application program is recorded. The process illustrated in FIG. 5 is completed, and the flow proceeds to step S120 of FIG. 4.

However, when it is determined in step S113 described above that no text information is contained, the flow proceeds to step S117, and "scanner generation=True" is returned. In other words, determination that the electronic document is read by the document reader 47, and is not generated by an application program is recorded. The process illustrated in FIG. 5 is completed, and the flow proceeds to step S120 of FIG. 4.

In step S115 described above, when it is determined that the image is present on the entire page and text information is displayed with transparent characters, the flow proceeds to next step S117, and the process illustrated in FIG. 5 is completed, and the flow proceeds to step S120 of FIG. 4.

In step S120, the CPU 61 of the information processing apparatus 60 performs type determination process 2. The type determination process 2 in step S120 will be described with reference to FIG. 6.

Figure 6:
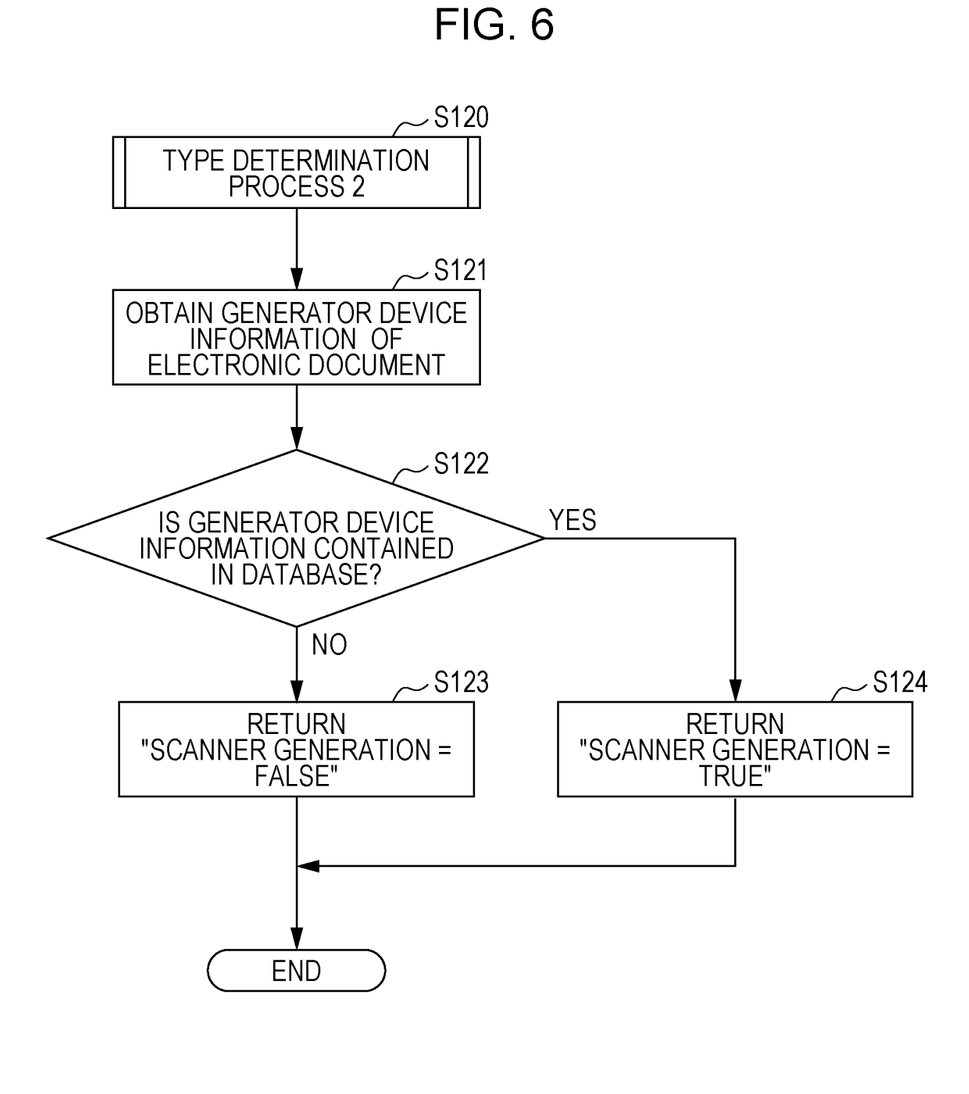
FIG. 6 is a flowchart illustrating a subroutine of type determination process 2 illustrated in FIG. 4.

First, in step S121, the CPU 61 of the information processing apparatus 60 obtains generator device information from a PDF-format electronic document. Thus, the flow proceeds to next step S122.

In step S122, the CPU 61 of the information processing apparatus 60 determines whether the generator device information is included in the generator device information database stored in the storage 44. When it is determined that the generator device information is not included in the generator device information database, the flow proceeds to next step S123.

In step S123, "scanner generation=False" is returned. In other words, determination that the electronic document is not read by the document reader 47, but is generated by an application program is recorded. The process illustrated in FIG. 6 is completed, and the flow proceeds to step S130 of FIG. 4.

However, when it is determined in step S122 described above that the generator device information is included in the generator device information database stored in the storage 44, the flow proceeds to next step S124, and "scanner generation=True" is returned. In other words, determination that the electronic document is read by the document reader 47, and is not generated by an application program is recorded. The process illustrated in FIG. 6 is completed, and the flow proceeds to step S130 of FIG. 4.

Note that even when it is determined that the generator device information is included in the generator device information database, if the generator device information matches predetermined generator device information, "scanner generation=False" may be returned without returning "scanner generation=True". For example, depending on the model of the image forming apparatus, the function of an OCR process performed at the time of reading by the document reader may not be simpler than the OCR process performed by the information processing apparatus 60, and it may be not necessary to perform the OCR process again by the information processing apparatus 60.

When the generator device information matches predetermined generator device information, and a predetermined condition is satisfied, for example, only in the case of a specific language, "scanner generation=True" may be returned, and an OCR process may be performed again by the information processing apparatus 60. This is because the accuracy of character recognition of the OCR process may be reduced depending on the language, thus in order to be able to improve the accuracy of character recognition, the OCR process is performed again by the information processing apparatus 60.

In step S130, the CPU 61 of the information processing apparatus 60 determines whether there is a record of "scanner generation=True", in other words, whether the electronic document was read by the document reader 47. When it is determined that there is no record of "scanner generation=True", the flow returns to step S100 described above. However, when it is determined that there is a record of "scanner generation=True", the flow proceeds to next step S140.

In step S140, the CPU 61 of the information processing apparatus 60 performs an OCR process on the electronic document read by the document reader 47, and embeds and records text data generated by the OCR process in the electronic document. The flow then returns to step S100 described above. Here, it is desirable that the text data generated by the OCR process be embedded in the electronic document instead of the text data embedded by the OCR process performed at the time of reading by the document reader 47. This is because as described above, the OCR process performed at the time of reading by the document reader 47 is simpler than the OCR process performed in step S140 by the information processing apparatus 60, and may be incomplete in which the accuracy of character recognition of the OCR process is low. Thus, if the electronic document is saved with the text data generated by the OCR process performed by the information processing apparatus 60, when search is made for the PDF-format electronic document later, information extraction performance can be improved.

In addition, the CPU 61 of the information processing apparatus 60 extracts predetermined attribute data from the text data generated by the OCR process, then embeds and stores the predetermined attribute data in an electronic document as the attribute information of the electronic document. The attribute data is, for example, a date, an address, a title, an item, a file name and the like stated in the electronic document. In addition, attribute data is extracted from the text data generated by the OCR process in accordance with a predetermined rule. For example, there is a rule for extracting a numerical value having a predetermined number of digits in coordinates in a predetermined range at the upper right of a page as date data, and a rule for extracting text data on the right side of a keyword such as "Mister" and "Mr." in coordinates in a predetermined range at the upper left of a page as address data. Note that such rules are set by the administrator or the like of the information processing system 10. However, without being limited to this, for example, multiple electronic documents are prepared, and an electronic document with text data generated by the OCR process embedded may be input to a learned model in which the electronic documents are learned as training data, and attribute data may be extracted.

Note that in the case of a PDF-format electronic document with no record of "scanner generation=True", in other words, in the case of an electronic document generated while maintaining text information by an application program of the PC 20, the OCR process is not performed by the information processing apparatus 60, and attribute data is extracted. The extracted attribute data is then embedded in the electronic document, and is stored as the attribute information of the electronic document. This is because in the case of an electronic document generated while maintaining text information by an application program, there is no problem in the accuracy of character recognition, thus it is not necessary to perform the OCR process, and the attribute data does not need to be extracted as it is.

The present disclosure is not limited to the above-described exemplary embodiment, and various modifications and applications are possible within a scope without departing from the spirit of the present disclosure.

Note that in the exemplary embodiment, an aspect has been described in which programs are stored (installed) in advance in a ROM or a storage. However, without being limited to this, the programs may be provided in a form recorded in a recording medium, such as a compact disk read only memory (CD-ROM), a digital versatile disk read only memory (DVD-ROM), and a universal serial bus (USB) memory. In addition, the programs may be provided in a form downloaded from an external apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
   receive an electronic document generated while maintaining text information by an application program or an electronic document generated by reading an image with a document reading apparatus;
   perform type determination as to whether the received electronic document including a portion representing a text is generated by the application program or generated by the document reading apparatus based on generator device information in the electronic document, wherein the electronic document stores the generator device information on a generator device that generated the electronic document; and
   determine based on a result of the type determination whether an optical character recognition process is to be performed on the electronic document.

2. The information processing apparatus according to claim 1, wherein the processor is configured to:
   in a case where the electronic document is determined to be generated by the document reading apparatus, perform the optical character recognition process on the electronic document to generate text data of the electronic document, and embed and store the text data in the electronic document.

3. The information processing apparatus according to claim 2, wherein the processor is configured to:
   extract predetermined attribute data from the text data, and embed and store the predetermined attribute data in the electronic document as attribute information of the electronic document.

4. The information processing apparatus according to claim 3, wherein the processor is configured to:
   perform the type determination based on whether an image is present on an entire page of the electronic document, and the text information is displayed with transparent characters.

5. The information processing apparatus according to claim 3, wherein the processor is configured to:
   perform the type determination based on whether predetermined generator device information includes model information that matches model information of the document reading apparatus.

6. The information processing apparatus according to claim 2, wherein the processor is configured to:
perform the type determination based on whether an image is present on an entire page of the electronic document, and the text information is displayed with transparent characters.

7. The information processing apparatus according to claim 6, wherein the processor is configured to:
perform the type determination based on whether predetermined generator device information includes model information that matches model information of the document reading apparatus.

8. The information processing apparatus according to claim 2, wherein the processor is configured to:
perform the type determination based on whether predetermined generator device information includes model information that matches model information of the document reading apparatus.

9. The information processing apparatus according to claim 1, wherein the processor is configured to:
perform the type determination based on whether an image is present on an entire page of the electronic document, and the text information is displayed with transparent characters.

10. The information processing apparatus according to claim 9, wherein the processor is configured to:
perform the type determination based on whether predetermined generator device information includes model information that matches model information of the document reading apparatus.

11. The information processing apparatus according to claim 1, wherein the processor is configured to:
perform the type determination based on whether predetermined generator device information includes model information that matches model information of the document reading apparatus.

12. The information processing apparatus according to claim 1, wherein text information contained in the electronic document generated by reading the image with the document reading apparatus is information embedded in the electronic document by an optical character recognition process performed at a time of reading the image with the document reading apparatus.

13. A non-transitory computer readable medium storing a program causing a computer to execute a process, the process comprising:
receiving an electronic document generated while maintaining text information by an application program or an electronic document generated by reading an image with a document reading apparatus;
performing type determination as to whether the received electronic document including a portion representing a text is generated by the application program or generated by the document reading apparatus based on generator device information in the electronic document, wherein the electronic document stores the generator device information on a generator device that generated the electronic document; and
determining based on a result of the type determination whether an optical character recognition process is to be performed on the electronic document.

14. An information processing method comprising:
receiving an electronic document generated while maintaining text information by an application program or an electronic document generated by reading an image with a document reading apparatus;
performing type determination as to whether the received electronic document including a portion representing a text is generated by the application program or generated by the document reading apparatus based on generator device information in the electronic document, wherein the electronic document stores the generator device information on a generator device that generated the electronic document; and
determining based on a result of the type determination whether optical character recognition process is to be performed on the electronic document.

* * * * *